US012771156B2

(12) United States Patent
Sauerteig et al.

(10) Patent No.: US 12,771,156 B2
(45) Date of Patent: Oct. 20, 2026

(54) METHOD AND SYSTEM FOR OPERATING AN ELECTRICALLY DRIVEN WORKING DEVICE WITH AT LEAST ONE BATTERY PACK, ELECTRICALLY DRIVEN WORKING DEVICE, AND/OR BATTERY PACK

(71) Applicant: Andreas Stihl AG & Co. KG, Waiblingen (DE)

(72) Inventors: Daniel Sauerteig, Kernen im Remstal (DE); Tobias Schmidt, Bondorf (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 104 days.

(21) Appl. No.: 18/613,398

(22) Filed: Mar. 22, 2024

(65) Prior Publication Data

US 2024/0322582 A1 Sep. 26, 2024

(30) Foreign Application Priority Data

Mar. 23, 2023 (EP) .................................... 23163807

(51) Int. Cl.

| | |
|---|---|
| ***H02J 7/00*** | (2006.01) |
| ***H02J 7/63*** | (2026.01) |
| ***H02J 7/80*** | (2026.01) |
| ***H02J 7/90*** | (2026.01) |
| ***H02P 29/40*** | (2016.01) |

(52) U.S. Cl.

CPC ................ *H02J 7/855* (2026.01); *H02J 7/63* (2026.01); *H02J 7/80* (2026.01); *H02J 7/977* (2026.01); *H02P 29/40* (2016.02)

(58) Field of Classification Search

CPC ................. H02J 7/0063; H02J 7/00306; H02J 7/007194; H02J 7/0047; H02P 29/40

See application file for complete search history.

(56) References Cited

U.S. PATENT DOCUMENTS

| | | | | |
|---|---|---|---|---|
| 9,321,368 | B2 | 4/2016 | Yang et al. | |
| 2002/0020381 | A1 | 2/2002 | Pels | |
| 2012/0247796 | A1 | 10/2012 | Mueller et al. | |
| 2017/0253231 | A1 | 9/2017 | Ciaccio et al. | |
| 2017/0366117 | A1* | 12/2017 | Cox | H02P 27/08 |
| 2018/0248507 | A1* | 8/2018 | Vanko | H02P 29/50 |
| 2020/0408842 | A1 | 12/2020 | Sada et al. | |
| 2022/0224138 | A1* | 7/2022 | Ko | B60L 58/13 |
| 2022/0244314 | A1 | 8/2022 | Yang et al. | |
| 2022/0355700 | A1* | 11/2022 | Ishii | B60L 53/62 |

(Continued)

FOREIGN PATENT DOCUMENTS

| | | |
|---|---|---|
| CN | 102487210 A | 6/2012 |
| DE | 198 40 819 C1 | 8/2000 |

(Continued)

*Primary Examiner* — Zoheb S Imtiaz
(74) *Attorney, Agent, or Firm* — Crowell & Moring LLP

(57) ABSTRACT

A method operates an electrically driven working device with at least one battery pack that is intended to supply the working device with electric drive power. The method includes the following steps: detecting a temperature of the battery pack, in particular of a battery cell of the battery pack, by way of a temperature sensor of the battery pack; determining a resistance variable of the battery pack on the basis of the detected temperature by way of the battery pack; and operating the working device on the basis of the determined resistance variable.

13 Claims, 3 Drawing Sheets

(56) References Cited

U.S. PATENT DOCUMENTS

| | | | |
|---|---|---|---|
| 2022/0393619 | A1 | 12/2022 | Ichikawa |
| 2023/0071975 | A1 | 3/2023 | Singer et al. |

FOREIGN PATENT DOCUMENTS

| | | | |
|---|---|---|---|
| DE | 2015 015 304 | A1 | 5/2016 |
| DE | 2017 000 645 | T5 | 10/2018 |
| EP | 505 316 | A2 | 10/2012 |

* cited by examiner

METHOD AND SYSTEM FOR OPERATING AN ELECTRICALLY DRIVEN WORKING DEVICE WITH AT LEAST ONE BATTERY PACK, ELECTRICALLY DRIVEN WORKING DEVICE, AND/OR BATTERY PACK

CROSS REFERENCE TO RELATED APPLICATION

This application claims priority under 35 U.S.C. § 119 from European Patent Application No. 23163807.3, filed Mar. 23, 2023, the entire disclosure of which is herein expressly incorporated by reference.

BACKGROUND AND SUMMARY

The invention relates to a method and to a system, in particular each, for operating an electrically driven working device with at least one battery pack, and to an electrically driven working device, and/or to a battery pack for such a system.

The invention is based on the problem of providing a method and a system for operating an electrically driven working device with at least one battery pack, said method and system having improved properties. The invention is also based on the problem of providing an electrically driven working device and/or a battery pack for such a system.

The invention solves this problem by providing a method, a system and an electrically driven working device and/or a battery pack as described in the independent claims. Advantageous developments and/or refinements of the invention are described in the dependent claims.

The method according to the invention is for operating an electrically driven working device with at least one battery pack, in particular multiple battery packs. The battery pack is intended to supply the working device with electric drive power. The method comprises the following steps: a) detecting a temperature of the battery pack, in particular of a battery cell of the battery pack, by way of a temperature sensor of the battery pack; b) determining a resistance variable of the battery pack, in particular at least of the battery cell, on the basis of the detected temperature by way of the battery pack; c) operating the working device on the basis of the determined resistance variable, in particular by way of the working device.

This, in particular the detection and the determination by way of the battery pack, enables simplicity of the working device and/or specificity of the resistance variable. In addition or as an alternative, in particular as a result, this enables optimum operation of the working device with the battery pack, in particular at low or cold temperatures.

In particular, the method, the operation, the power supply, the detection and/or the determination may be automatic and/or computer-implemented.

The working device and/or the battery pack may be mobile or portable. In particular, mobile may mean a mass of at most 50 kg (kilograms), in particular at most 20 kg, in particular at most 10 kg, in particular at most 5 kg, and/or at least 0.2 kg, in particular at least 0.5 kg, in particular at least 1 kg, in particular at least 2 kg.

The working device may have a treatment tool and/or an electric drive motor, in particular for driving the treatment tool. In particular, the drive power may be for the electric drive motor.

The battery pack may have a plurality of the battery cells. In particular, the battery cells may each be individual rechargeable electrochemical-based storage elements for electrical energy. In addition or as an alternative, the battery cells may be lithium-ion battery cells. Again in addition or as an alternative, the battery cells may be identical, in particular of identical type and/or structure. Again in addition or as an alternative, a respective cell voltage, in particular cell rated voltage, of a respective one of the battery cells may be at least 2 V (volts) and/or at most 4.2 V, in particular 3.6 V. Again in addition or as an alternative, the battery cells may be round cells, prismatic cells or pouch cells.

The working device and the battery pack may be electrically, and in particular mechanically, connected to one another in detachable fashion for power supply purposes. The working device and the battery pack may in particular have detachable electrical power contacts for power supply purposes. In addition or as an alternative, the connection may be contact-based or the power contacts may be intended to make contact with one another. Again in addition or as an alternative, the power contacts may have, in particular be, plug connectors. Again in addition or as an alternative, the constituent term "terminal" may be used synonymously for the constituent term "contact". Again in addition or as an alternative, the term "coupled" may be used synonymously for the term "connected". Again in addition or as an alternative, detachable may mean detachable without tools, without destruction and/or able to be detached by a user. Again in addition or as an alternative, the working device and the battery pack may be intended for removal and/or exchange of the battery pack, in particular by the user. In particular, the working device may have a battery bay, wherein the battery bay may be intended to receive the battery pack.

The term "designed", "configured" or "set up" may be used synonymously for the term "intended".

The term "comprises" may be used synonymously for the term "has" or "contains".

The term "measure" may be used synonymously for the term "detect" or "acquire".

The temperature sensor may be electrical.

The temperature sensor may deliver an electrical signal as a measure of the temperature, or the temperature may be acquired by way of the signal.

The temperature may be measured accurately to within at least 1° C. (degrees Celsius).

The temperature and/or the resistance variable may have a value.

The resistance variable may be an electrical resistance. In addition or as an alternative, the resistance variable might not or does not have to be the temperature. Again in addition or as an alternative, the resistance variable may have, in particular be, a DC voltage and/or internal resistance variable. Again in addition or as an alternative, the operation may take place on the basis of another resistance variable, such as for example a contact resistance variable and/or line resistance variable.

The phrase "based on" may be used synonymously for the phrase "on the basis of".

The term "control" may be used synonymously for the term "operate".

The term "compute" may be used synonymously for the term "determine".

The determination may be carried out by way of an, in particular electrical, determination unit of the battery pack.

The operation may take place by way of an, in particular electrical, operating unit, in particular of the working device.

Step b) may take place at a time after step a). In addition or as an alternative, step c) may take place at a time after step b).

The phrase "are carried out" may be used synonymously for the term "take place".

Step a) and/or step b) might not or do/does not need to be carried out by way of the working device.

The working device might not or does not need to have a temperature sensor, in particular for detecting the temperature of the battery pack.

In particular, step c) may comprise: operating the working device on the basis of a state of charge variable, in particular a charge state, and/or a state of health variable, in particular a state of health, of the battery pack.

In one development of the invention, step b) comprises: determining the resistance variable on the basis of the state of charge variable, in particular the state of charge, and/or the state of health variable, in particular the state of health, of the battery pack, in particular by way of the battery pack. In particular, the method comprises the following step, in particular at a time before step b): detecting a voltage of the battery pack for the state of charge variable, in particular by way of the battery pack. In addition or as an alternative, the method comprises the following step, in particular at a time before step b): detecting a charging current of the battery pack for a charging variable, in particular a charge, and in particular an, in particular the, voltage of the battery pack, for the state of health variable, in particular by way of the battery pack and/or an, in particular electric, charger. This enables particularly good specificity of the resistance variable and thus particularly optimum operation. In particular, the state of charge variable, the state of health variable, the voltage, the charging current and/or the charging variable may have a value. In addition or as an alternative, the state of charge variable and/or the state of health variable may be accurate to within at least 1% (percent). Again in addition or as an alternative, the detection may be automatic. Again in addition or as an alternative, the voltage may be detected by way of an, in particular electrical, voltage sensor. Again in addition or as an alternative, the charging current may be detected by way of an, in particular electrical, current sensor. Again in addition or as an alternative, the battery pack and the charger may be electrically, and in particular mechanically, connectable, in particular connected, to one another in detachable fashion in order to supply the battery pack with electric charging power. In particular, at one time, either the battery pack and the charger or the battery pack and the working device may be connected to one another for power supply purposes. Again in addition or as an alternative, the state of health variable may be stored in the battery pack, in particular a storage unit of the battery pack. Again in addition or as an alternative, the state of health variable may be ascertained over a number of charging cycles and/or a charging cycle duration. Reference is also made to the specialist literature.

In one development of the invention, the method comprises the following step: detecting an, in particular the, voltage, in particular by way of the battery pack and/or the working device. Step c) comprises: operating the working device on the basis of the detected voltage, in particular such that the voltage remains above a cut-off voltage limit for the protective cut-off of the battery pack prior to an undervoltage. This enables particularly optimum operation, in particular a maximum degree of use of a voltage window of the battery pack, and/or means that the cut-off voltage limit is not reached. In particular, the detection may be automatic. In addition or as an alternative, the voltage may be detected by way of an, in particular electric, voltage sensor. Again in addition or as an alternative, the voltage may be measured accurately to within at least 1 V (volt). Again in addition or as an alternative, the voltage and/or the cut-off voltage limit may have a value. Again in addition or as an alternative, the term "discharge end voltage" may be used synonymously for the term "cut-off voltage limit". Again in addition or as an alternative, the constituent term "threshold" may be used synonymously for the constituent term "limit". Again in addition or as an alternative, a cut-off voltage limit variable, in particular the cut-off voltage limit, may be saved, in particular stored, in the working device, in particular a storage unit of the working device.

In one development of the invention, the method comprises the following step: determining a maximum drive power variable and/or maximum drive current variable, in particular a maximum drive power and/or a maximum drive current, on the basis of the resistance variable, of the detected voltage and of the cut-off voltage limit variable, in particular of the cut-off voltage limit, in particular by way of the working device and/or the battery pack. Step c) comprises: operating the working device on the basis of the determined maximum drive power variable and/or maximum drive current variable, in particular until the maximum drive power variable and/or maximum drive current variable is reached. This allows the voltage to remain above the cut-off voltage limit or to always drop to a value just above the cut-off voltage limit. In addition or as an alternative, this, in particular the reaching of the maximum drive power variable and/or maximum drive current variable, enables particularly optimum operation, in particular a maximum degree of use of a performance window of the battery pack, and/or maximum or rapid self-heating of the battery pack at low temperatures or a rapid increase in temperature. This thus enables a fast reduction or lowering or decrease of the resistance variable. This thus enables a fast increase or boost of the maximum drive power variable and/or maximum drive current variable and/or low or minimum energy consumption therefor. In particular, the determination may be automatic and/or computer-implemented. In addition or as an alternative, the determination may be carried out by way of an, in particular electrical, determination unit. Again in addition or as an alternative, the constituent term "discharge" may be used synonymously for the constituent term "drive". Again in addition or as an alternative, the maximum drive power variable and/or maximum drive current variable may have a value. Again in addition or as an alternative, the determination of the maximum drive power variable and/or maximum drive current variable and/or the operation may take place such that a maximal maximum drive power variable and/or maximum drive current variable or peak maximum drive power variable and/or maximum drive current variable is not exceeded, in particular in order to protect the battery pack and/or the working device from overloading. Again in addition or as an alternative, the operation may take place such that the maximum drive power variable and/or maximum drive current variable is not exceeded.

In one development, in particular one refinement, of the invention, the working device has an, in particular the, electric drive motor. The operating comprises: operating the electric drive motor so as to increase an electric drive power of the electric drive motor, in particular starting from zero and/or so as to reach a setpoint speed and/or a setpoint torque of the electric drive motor. In particular, the resistance variable is determined at least, in particular only, when the drive power is zero and/or the voltage is detected at least, in particular only, when the drive power is zero. This enables a fast start-up, in particular fast starting, of the working device with the battery pack, in particular at low temperatures, and/or where typically a drive power demand or loading or a voltage drop is highest or greatest. In addition or as an alternative, this makes it possible to determine the resistance variable and/or the maximum drive power variable and/or maximum drive current variable at a time before the operation, in particular starting. Again in addition or as an alternative, this, in particular the determination and/or detection when the drive power is zero, bestows a high level of significance on the resistance variable and/or the voltage. In particular, the resistance variable may be determined and/or the voltage may be detected at any time. However, only the resistance variable determined when the drive power is zero and/or the voltage detected when the drive power is zero may be used and/or the working device may only react thereto when or if the drive power was zero. In addition or as an alternative, the operation may take place so as to increase a speed of the electric drive motor, in particular from a stationary state. In particular, the resistance variable may be determined and/or the voltage may be detected in the stationary state. Reference is also made to the specialist literature.

In particular, this may enable a faster start-up, in particular faster starting, than a start-up through pure regulation of the voltage, for which purpose a current has to be increased via a ramp (for example via a slow speed increase of the working device), with a drop in the voltage of the battery pack having to be measured. This might not or does not need to be possible for typical working devices, which are meant to accelerate in the shortest possible time. By way of example, a load current rise in a few microseconds, for which purpose a voltage measurement in the 10 to 100 nanosecond range would be necessary for regulation purposes, cannot or does not need to be achieved with commercially available microcontrollers.

In other words: According to the invention, the voltage might not or does not need to be regulated purely such that the voltage remains above the cut-off voltage limit.

In addition or as an alternative, this may enable a faster start-up, in particular faster starting, than ascertaining the resistance variable by generating and evaluating a current test pulse at a time before the actual starting.

In other words, according to the invention, a current might not or does not need to be detected before starting, or this is possible in the stationary state.

In particular, the method may comprise the following step, in particular at a time after step b) and/or at a time before step c): communicating the detected voltage and/or the determined maximum drive power variable and/or maximum drive current variable from the battery pack to the working device.

In one development of the invention, the method comprises the following step, in particular at a time after step b) and/or at a time before step c): communicating the determined resistance variable from the battery pack to the working device. Step c) comprises: operating the working device on the basis of the communicated resistance variable. In particular, the communication may be automatic. In addition or as an alternative, the communication may take place by way of an, in particular electrical, communication unit, in particular of the battery pack and/or of the working device. Again in addition or as an alternative, the working device and the battery pack may have detachable electrical communication contacts for the communication. In particular, the communication contacts may be intended to make contact with one another. In addition or as an alternative, the communication contacts may have, in particular be, plug connectors. Again in addition or as an alternative, the step may comprise: communicating the cut-off voltage limit variable, in particular the cut-off voltage limit, and/or the detected temperature from the battery pack to the working device. Step c) may comprise: operating the working device on the basis of the communicated cut-off voltage limit variable.

In one development, in particular one refinement, of the invention, step a) and/or step b) are/is carried out, and in particular the voltage is detected and/or the maximum drive power variable and/or maximum drive current variable are/is determined and/or the resistance variable is communicated, in particular again, at least, in particular only and/or immediately or directly, at a time before each operating, in particular each increase in the drive power starting from zero, in particular until the maximum drive power variable and/or maximum drive current variable is reached. This makes it possible to keep the temperature, the resistance variable, the voltage and/or the maximum drive power variable and/or maximum drive current variable up-to-date. In particular, the term "repeatedly" may be used synonymously for the term "again".

In one development, in particular one refinement, of the invention, the method comprises the following step: if the detected temperature is below a lower temperature limit and/or the determined resistance variable is above a resistance variable limit and/or the determined maximum drive power variable and/or maximum drive current variable is below a maximum drive power variable limit and/or maximum drive current variable limit, outputting, in particular displaying, user-perceptible information in relation thereto, in particular by way of the working device. This makes it possible to give the user feedback, in particular for the warm-up mode. In particular, the lower temperature limit, the resistance variable limit and/or the maximum drive power variable limit and/or maximum drive current variable limit may be saved, in particular stored, in the battery pack and/or the working device, in particular a storage unit of the battery pack and/or of the working device. In addition or as an alternative, the outputting may be automatic. Again in addition or as an alternative, the outputting may take place by way of an, in particular electrical, output unit, in particular a display. In particular, the display may have, in particular be, at least one LED. Again in addition or as an alternative, the information may contain a content item.

In one development, in particular one refinement, of the invention, the working device has a user-actuatable, in particular user-adjustable, operating element, in particular for the setpoint speed. Step c) or the operation takes place in a manner triggered by, in particular on the basis of, an actuation, in particular adjustment, of the operating element. Reference is also made to the specialist literature.

In one development of the invention, step b) comprises: determining the resistance variable by way of a model, in particular a map, of the battery pack. This enables accuracy of the resistance variable. In particular, the model may be mathematical. In addition or as an alternative, the model may have, in particular be, a table and/or a function. Again in addition or as an alternative, the temperature may be described as an input variable of the model. Again in addition or as an alternative, the resistance variable may be described as an output variable of the model. Again in addition or as an alternative, the model may be saved, in particular stored, in the battery pack, in particular a storage unit of the battery pack. Again in addition or as an alternative, the term "set of characteristic curves" may be used synonymously for the term "map".

In one development of the invention, the working device is selected from a set of different working devices able to be electrically connected to the battery pack in detachable fashion. In addition or as an alternative, the battery pack is selected from a set of different battery packs able to be electrically connected to the working device in detachable fashion. In particular, at one time, either the battery pack and the working device or the battery pack and another working device may be connected to one another for power supply purposes. In addition or as an alternative, the battery packs may differ in terms of an, in particular the, respective resistance variable and/or an, in particular the, respective dependency, in particular owing to different battery cells, different cell interconnection and/or different system designs.

In one development of the invention, the working device is ground-guided and/or hand-guided, in particular hand-held, and/or a gardening, forestry, construction and/or ground working device. In particular, the working device is a saw, or a pruner, or a hedge trimmer, or a hedge cutter, or a woodcutter, or pruning shears, or an angle grinder, or a blower, or a leaf blower, or a vacuum cleaner, or a leaf vacuum, or a cleaning device, or a high-pressure cleaner, or a sweeper, or a sweeper roller, or a sweeping brush, or a lawnmower, or a grass trimmer, or a brush cutter, or a scarifier. This, in particular the method, is particularly good for such a working device.

The system according to the invention is for operating the electrically driven working device with at least the battery pack. The battery pack is intended to supply the working device with electric drive power. The system comprises the temperature sensor of the battery pack, the determination unit of the battery pack and the operating unit. The temperature sensor is intended to detect the temperature of the battery pack. The determination unit is intended to determine the resistance variable of the battery pack on the basis of the detected temperature. The operating unit is intended to operate the working device on the basis of the determined resistance variable. The system may enable the same advantages(s) as for the method mentioned above. In particular, the system may be intended, in particular automatically, to carry out the method as mentioned above. In addition or as an alternative, the system may be electrical. Again in addition or as an alternative, the system, the determination unit and/or the operating unit may have, in particular be, a computing unit and/or a processor and/or a microcontroller and/or a storage unit and/or a computer. Again in addition or as an alternative, the system may contain the communication unit, wherein the communication unit may be intended to communicate the determined resistance variable from the battery pack to the working device.

In one development of the invention, the system comprises the working device, in particular wherein the working device comprises the operating unit, and/or the battery pack. In particular, the working device and/or the battery pack may be provided in the same way as mentioned above for the method. In particular, the system may contain the charger.

The electrically driven working device according to the invention and/or the battery pack according to the invention are/is for the system as mentioned above.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
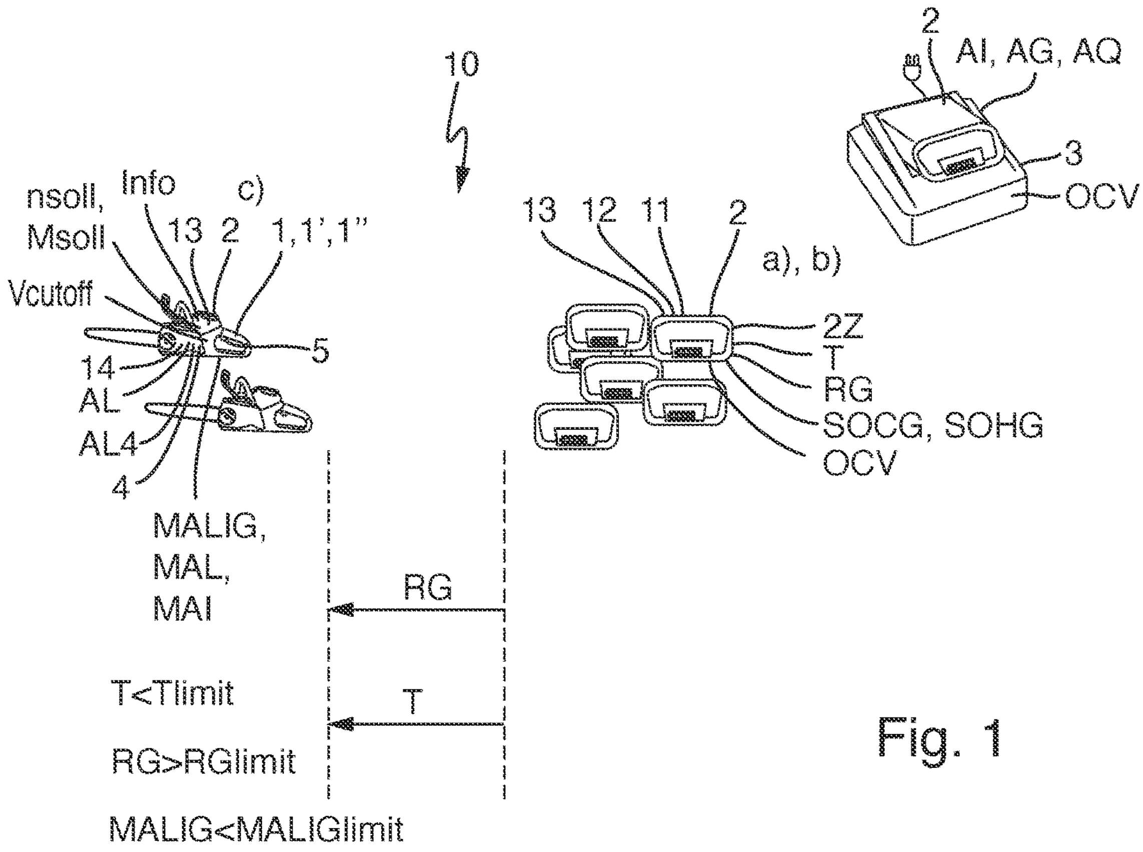
FIG. 1 schematically shows an exemplary system according to the invention comprising an electrically driven working device and a battery pack, and a method for operating the working device with the battery pack, FIG. 2 schematically shows a model for determining a resistance variable of the battery pack.

FIG. 1 shows a system 10 and a method for operating an electrically driven working device 1 with at least one battery pack 2. The battery pack 2 is intended to supply, in particular supplies, the working device 1 with electric drive power AL.

Figure 2:
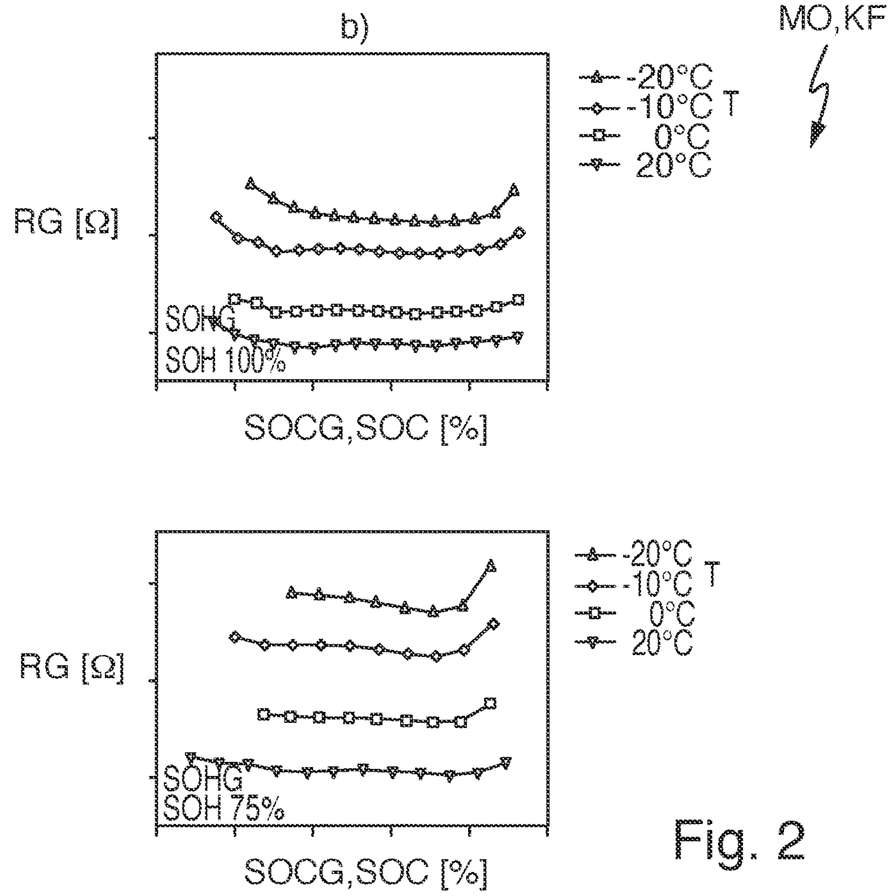

The system 10 comprises a temperature sensor 11 of the battery pack 2, a determination unit 12 of the battery pack 2 and an operating unit 14. The temperature sensor 11 is intended to detect, in particular detects, a temperature T of the battery pack 2. The determination unit 12 is intended to determine, in particular determines, a resistance variable RG of the battery pack 2 on the basis of the detected temperature T, as shown in FIG. 2. The operating unit 14 is intended to operate, in particular operates, the working device 1 on the basis of the determined resistance variable RG.

In detail, the system 10 comprises the working device 1, in particular wherein the working device 1 comprises the operating unit 14, and/or the battery pack 2.

The method comprises the following steps: a) detecting the temperature T of the battery pack 2, in particular of a battery cell 2Z of the battery pack 2, by way of the temperature sensor 11 of the battery pack 2; b) determining the resistance variable RG of the battery pack 2 on the basis of the detected temperature T by way of the battery pack 2; c) operating the working device 1 on the basis of the determined resistance variable RG.

In detail, step b) comprises: determining the resistance variable RG on the basis of a state of charge variable SOCG, in particular a state of charge SOC, and/or a state of health variable SOHG, in particular a state of health SOH, of the battery pack 2, as shown in FIG. 2. In particular, the method comprises the following step, in particular at a time before step b): Detecting a voltage OCV of the battery pack 2 for the state of charge variable SOCG, in particular by way of the battery pack 2. In addition or as an alternative, the method comprises the following step, in particular at a time before step b): detecting a charging current AI of the battery pack 2 for a charging variable AG, in particular a charge AQ, and in particular a voltage OCV of the battery pack 2, for the state of health variable SOHG, in particular by way of the battery pack 2 and/or a charger 3.

The method furthermore comprises the following step: detecting an, in particular the, voltage OCV, in particular by way of the battery pack 2 and/or the working device 1. Step c) comprises: operating the working device 1 on the basis of the detected voltage OCV, in particular such that the voltage V remains above a cut-off voltage limit Vcutoff for the protective cut-off of the battery pack 2 prior to an undervoltage, as shown in the middle of FIG. 3.

In detail, the method comprises the following step: determining a maximum drive power variable and/or maximum drive current variable MALIG, in particular a maximum drive power MAL and/or a maximum drive current MAI, on the basis of the resistance variable RG, of the detected voltage OCV and of a cut-off voltage limit variable VcutoffG, in particular of the cut-off voltage limit Vcutoff, in particular by way of the working device 1. Step c) comprises: operating the working device 1 on the basis of the determined maximum drive power variable and/or maximum drive current variable MALIG, in particular until the maximum drive power variable and/or maximum drive current variable MALIG is reached, as shown at the top and in the middle of FIG. 3.

In other words: MAI=(OCV−Vcutoff−Vmargin)/(RG+R1) or MAL=MAI×Vcutoff, where Vmargin is a voltage tolerance and R1 is a resistance of the working device 1.

Figure 3:
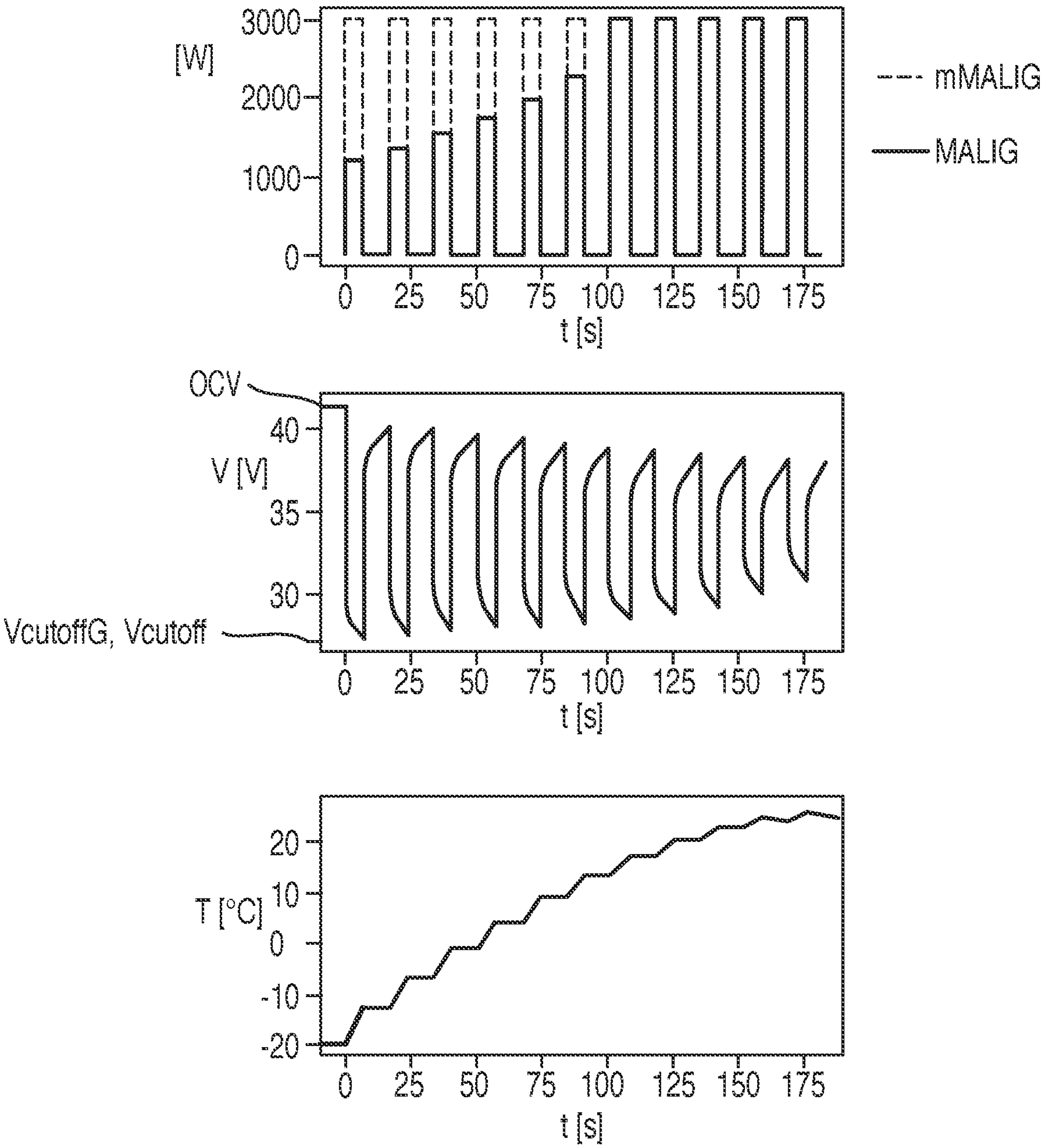
FIG. 3 schematically shows a maximum drive power variable and/or maximum drive current variable for operating the working device over time, a voltage of the battery pack over time, and a temperature of the battery pack over time.

In particular, the determination of the maximum drive power variable and/or maximum drive current variable MALIG and/or the operation take place/takes place such that a maximum drive power variable and/or maximum drive current variable mMALIG is not exceeded, as shown at the top of FIG. 3.

Figure 4:
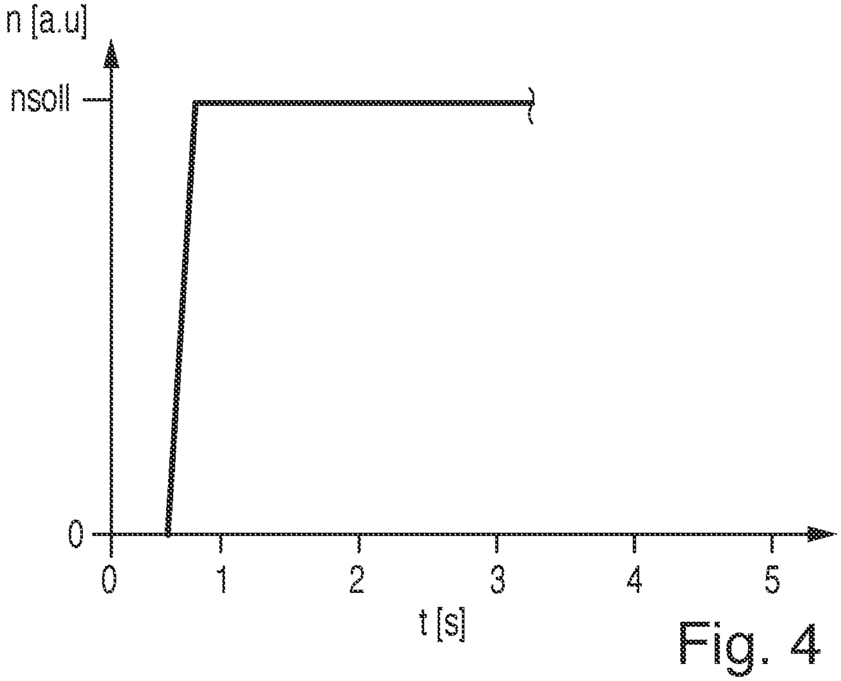
FIG. 4 schematically shows a speed of an electric drive motor of the working device over time.

The working device 1 furthermore has an electric drive motor 4. The operating comprises: operating the electric drive motor 4 so as to increase an electric drive power AL4, in particular a speed n, of the electric drive motor 4, in particular starting from zero and/or so as to reach a setpoint speed nsoll and/or a setpoint torque Msoll of the electric drive motor 4, as shown at 0 s to 1 s in FIG. 4. In particular, the resistance variable RG is determined at least when the drive power AL4 is zero and/or the voltage OCV is detected at least when the drive power is zero.

The method furthermore comprises the following step, in particular at a time after step b) and/or at a time before step c): communicating the determined resistance variable RG from the battery pack 2 to the working device 1, in particular by way of a communication unit 13, in particular of the battery pack 2 and/or of the working device 1, as shown in FIG. 1. Step c) comprises: operating the working device 1 on the basis of the communicated resistance variable RG.

In addition, step a) and/or step b) are/is carried out, and in particular the voltage OCV is detected and/or the maximum drive power variable and/or maximum drive current variable MALIG are/is determined and/or the resistance variable RG is communicated, in particular again, at least at a time before each Operating, in particular each increase in the drive power AL4 starting from zero, in particular until the maximum drive power variable and/or maximum drive current variable mMALIG is reached, as shown in FIG. 3.

This enables rapid self-heating of the battery pack 2 at low temperatures T or makes it possible to quickly increase the temperature T. This thus enables a rapid reduction of the resistance variable RG. This thus enables a rapid increase in the maximum drive power variable and/or maximum drive current variable MALIG and/or minimum energy consumption therefor.

In other words, a currently possible maximum drive power variable and/or maximum drive current variable MALIG is determined. Upon a further start-up of the working device 1, the maximum drive power variable and/or maximum drive current variable MALIG that is then possible is determined, this having increased due to the heating of the battery pack 2 or the increase in the temperature T and the resulting reduced resistance variable RG compared to the one determined at a time before this.

The method furthermore comprises the following step: if the detected temperature T is below a lower temperature limit Tlimit and/or the determined resistance variable RG is above a resistance variable limit RGlimit and/or the determined maximum drive power variable and/or maximum drive current variable MALIG is below a maximum drive power variable limit and/or maximum drive current variable limit MALIGlimit, outputting, in particular displaying, user-perceptible information Info in relation thereto, in particular by way of the working device 1, as shown in FIG. 1.

In addition, the working device 1 has a user-actuatable, in particular user-adjustable, operating element 5, in particular for the setpoint speed nsoll. Step c) takes place in a manner triggered by, in particular on the basis of, an actuation, in particular adjustment, of the operating element 5.

Step b) furthermore comprises: determining the resistance variable RG by way of a model MO, in particular a map KF, of the battery pack 2, as shown in FIG. 2.

Figure 5:
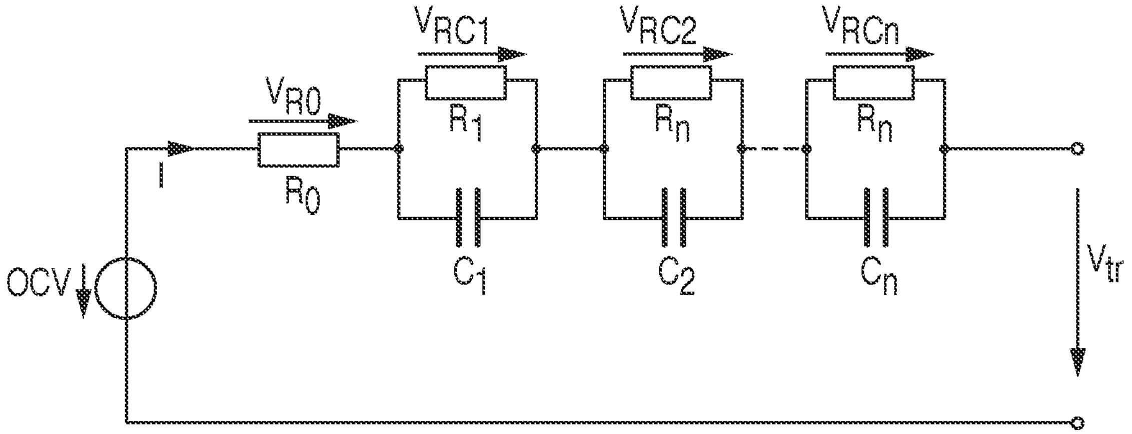
FIG. 5 schematically shows an equivalent circuit diagram of the battery pack.

In detail, FIG. 5 schematically shows an equivalent circuit diagram of the battery pack 2. The resistance behavior of the battery pack 2 may be understood or modelled as a series interconnection of a resistor with further RC elements. In the event of sudden loading with a current pulse, a voltage drops immediately across R0. The voltage drop across the RC elements is time-dependent in accordance with the time constants thereof. The model MO, in particular the map KF, in particular a parameterization thereof, for determining the resistance variable RG is designed such that the time constants for the typical applications of the battery pack 2 are taken into account.

In addition, the working device 1 is selected from a set of different working devices 1 able to be electrically connected to the battery pack 2 in detachable fashion. In addition or as an alternative, the battery pack 2 is selected from a set of different battery packs 2 able to be electrically connected to the working device 1 in detachable fashion.

Furthermore, the working device 1 is ground-guided and/or hand-guided, in particular hand-held, and/or a gardening, forestry, construction and/or ground working device 1'. In particular, the working device 1 is a saw 1", or a pruner, or a hedge trimmer, or a hedge cutter, or a woodcutter, or pruning shears, or an angle grinder, or a blower, or a leaf blower, or a vacuum cleaner, or a leaf vacuum, or a cleaning device, or a high-pressure cleaner, or a sweeper, or a sweeper roller, or a sweeping brush, or a lawnmower, or a grass trimmer, or a brush cutter, or a scarifier.

Moreover, an, in particular electrical, rated voltage of the battery pack 2 and/or of the working device 1 is 36 V. In alternative exemplary embodiments, the rated voltage may be less than or more than 36 V, in particular 18 V or 72 V.

In addition or as an alternative, the drive power AL is at least 10 watts (W), in particular at least 100 W, in particular at least 1 kW (kilowatt), in particular at least 2 kW, and/or at most 10 kW, in particular at most 5 kW, in particular 3 kW.

Again in addition or as an alternative, a maximum, in particular electrical, energy content, in particular rated energy content, of the battery pack 2 is at least 50 Wh (watt hours), in particular at least 100 Wh, in particular at least 200 Wh, and/or at most 4000 Wh, in particular at most 2000 Wh, in particular at most 1000 Wh, in particular at most 500 Wh, in particular 337 Wh.

As elucidated by the exemplary embodiments shown and explained above, the invention provides the advantageous method and the advantageous system for operating the electrically driven working device with at least the battery pack, said method and system having improved properties. Furthermore, the invention provides the advantageous electrically driven working device and/or the advantageous battery pack for the system.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an electrically driven working device with at least one battery pack that is to supply the working device with electric drive power, the method comprising the steps of:

a) detecting a temperature (T) of the battery pack, by way of a temperature sensor of the battery pack, b) determining a resistance variable (RG) of the battery pack on the basis of the detected temperature by way of the battery pack, and c) operating the working device on the basis of the determined resistance variable (RG), wherein the working device and the battery pack are detachably electrically connected to one another to supply power to operate the working device, wherein the working device is a ground-guided and/or hand-guided and/or a gardening, forestry, construction and/or ground working device, wherein one or both of: (i) the working device is selected from a set of different working devices able to be electrically connected to the battery pack in detachable fashion, or (ii) the battery pack is selected from a set of different battery packs able to be electrically connected to the working device in detachable fashion, and wherein the method further comprises:

detecting a voltage (OCV), by way of the battery pack and/or the working device, and wherein step c) comprises:

operating the working device on the basis of the detected voltage (OCV), such that a voltage (V) remains above a cut-off voltage limit (Vcutoff) for a protective cut-off of the battery pack prior to an undervoltage, and wherein the method still further comprises:

determining a maximum drive power variable and/or maximum drive current variable (MALIG) on the basis of the resistance variable (RG), of the detected voltage (OCV) and of a cut-off voltage limit variable (Vcutoff), by way of the working device, and wherein step c) comprises:

operating the working device on the basis of the determined maximum drive power variable and/or maximum drive current variable (MALIG), until the maximum drive power variable and/or maximum drive current variable (MALIG) is reached, wherein the working device has an electric drive motor, and wherein step c) still further comprises:

operating the electric drive motor so as to increase an electric drive power (AL4) of the electric drive motor, starting from zero and/or so as to reach a setpoint speed (nsoll) and/or a setpoint torque (Msoll) of the electric drive motor, wherein the resistance variable (RG) is determined and the voltage (OCV) is detected at least when the electric drive power (AL4) is zero.

2. The method according to claim 1, wherein step b) further comprises:

determining the resistance variable (RG) on the basis of a state of charge variable (SOCG) and/or a state of health variable (SOHG) of the battery pack.

3. The method according to claim 2, wherein the method further comprises:

at a time before step b): detecting a voltage (OCV) of the battery pack for the state of charge variable (SOCG), by way of the battery pack, and/or at a time before step b): detecting a charging current (AI) of the battery pack for a charging variable (AG) for the state of health variable (SOHG), by way of the battery pack and/or a charger.

4. The method according to claim 1, wherein the method further comprises:

at a time after step b) and/or at a time before step c), communicating the determined resistance variable (RG) from the battery pack to the working device, and wherein step c) further comprises:

operating the working device on the basis of the communicated resistance variable (RG).

5. The method according to claim 1, wherein the voltage (OCV) is detected and/or the maximum drive power variable and/or maximum drive current variable (MALIG) are/is determined again, at least at a time before each increase in electric drive power (AL4) starting from zero.

6. The method according to claim 1, wherein the resistance variable (RG) is communicated again, at least at a time before each increase in the electric drive power (AL4) starting from zero.

7. The method according to claim 1, wherein the method further comprises:

when the detected temperature (T) is below a lower temperature limit (Tlimit) and/or the determined resistance variable (RG) is above a resistance variable limit (RGlimit) and/or the determined maximum drive power variable and/or maximum drive current variable (MALIG) is below a maximum drive power variable limit and/or maximum drive current variable limit (MALIGlimit), outputting user-perceptible information (Info) in relation thereto by way of the working device.

8. The method according to claim 1, wherein the working device has a user-actuatable operating element for the setpoint speed (nsoll), and wherein step c) takes place in a manner triggered by an actuation of the operating element.

9. The method according to claim 1, wherein step b) comprises:

determining the resistance variable (RG) by way of a model (MO) of the battery pack.

10. The method according to claim 1, wherein the working device is a saw, a pruner, a hedge trimmer, a hedge cutter, a woodcutter, pruning shears, an angle grinder, a blower, a leaf blower, a vacuum cleaner, a leaf vacuum, a cleaning device, a high-pressure cleaner, a sweeper, a sweeper roller, a sweeping brush, a lawnmower, a grass trimmer, a brush cutter, or a scarifier.

11. A system for operating an electrically driven working device with at least one battery pack that supplies an electric drive motor of the working device with electric drive power (AL), the system comprising:

a temperature sensor of the battery pack, which detects a temperature (T) of the battery pack;

a detection unit of the battery pack and/or the working device that detects a voltage (OCV);

a determination unit of the battery pack, which determines a resistance variable (RG) of the battery pack on the basis of the detected temperature (T);

a determination unit of the working device, which determines a maximum drive power variable and/or maximum drive current variable (MALIG) on the basis of the resistance variable (RG), of the detected voltage (OCV) and of a cut-off voltage limit variable (Vcutoff), and an operating unit, which operates the working device on the basis of the determined resistance variable, wherein the operating unit further operates the working device on the basis of the detected voltage (OCV), such that a voltage (V) remains above a cut-off voltage limit (Vcutoff) for a protective cut-off of the battery pack prior to an undervoltage, wherein the operating unit still further operates the working device on the basis of the determined maximum drive power variable and/or maximum drive current variable (MALIG), until the maximum drive power variable and/or maximum drive current variable (MALIG) is reached, and wherein the operating unit operates the electric drive motor so as to increase an electric drive power (AL4) of the electric drive motor, starting from zero and/or so as to reach a setpoint speed (nsoll) and/or a setpoint torque (Msoll) of the electric drive motor, wherein the resistance variable (RG) is determined and the voltage (OCV) is detected at least when the electric drive power (AL4) is zero wherein the working device and the battery pack are detachably electrically connected to one another to supply power to operate the working device, wherein the working device is a ground-guided and/or hand-guided and/or a gardening, forestry, construction and/or ground working device, and wherein one or both of: (i) the working device is selected from a set of different working devices able to be electrically connected to the battery pack in detachable fashion, or (ii) the battery pack is selected from a set of different battery packs able to be electrically connected to the working device in detachable fashion.

12. The system according to claim 11, further comprising:

the working device equipped with the operating unit, and/or the battery pack.

13. An electrically driven working device and/or battery pack for use in a system according to claim 11.

* * * * *